United States Patent
Hayashi et al.

(10) Patent No.: US 11,667,748 B2
(45) Date of Patent: Jun. 6, 2023

(54) CURABLE COMPOSITION, CURABLE PASTE MATERIAL, CURABLE SHEET MATERIAL, CURABLE MODELING MATERIAL, CURING METHOD, AND CURED PRODUCT

(71) Applicant: MITSUBISHI HEAVY INDUSTRIES, LTD., Tokyo (JP)

(72) Inventors: Noriya Hayashi, Tokyo (JP); Toshikatsu Sakakibara, Tokyo (JP); Yusuke Kobayashi, Tokyo (JP); Tatsuya Kimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/636,673

(22) PCT Filed: Aug. 29, 2017

(86) PCT No.: PCT/JP2017/030905
§ 371 (c)(1),
(2) Date: Feb. 5, 2020

(87) PCT Pub. No.: WO2019/043778
PCT Pub. Date: Mar. 7, 2019

(65) Prior Publication Data
US 2020/0190251 A1    Jun. 18, 2020

(51) Int. Cl.
| | |
|---|---|
| *C08G 59/24* | (2006.01) |
| *C08G 59/02* | (2006.01) |
| *C08G 65/18* | (2006.01) |
| *C08K 5/375* | (2006.01) |
| *C08K 3/36* | (2006.01) |
| *C08G 59/22* | (2006.01) |
| *C08G 65/22* | (2006.01) |
| *C08G 59/68* | (2006.01) |
| *C08L 63/00* | (2006.01) |

(52) U.S. Cl.
CPC ......... *C08G 59/245* (2013.01); *C08G 59/022* (2013.01); *C08G 65/18* (2013.01); *C08K 5/375* (2013.01); *C08K 3/36* (2013.01)

(58) Field of Classification Search
None
See application file for complete search history.

(56) References Cited

U.S. PATENT DOCUMENTS

| | | | | |
|---|---|---|---|---|
| 5,359,017 | A | * 10/1994 | Hamazu | ............... C08G 65/105 528/92 |
| 6,599,954 | B1 | 7/2003 | Hayashi et al. | |
| 2004/0110010 | A1* | 6/2004 | Buchwalter | ............. H01L 24/29 257/E21.503 |
| 2016/0215183 | A1* | 7/2016 | Tanaka | ................... H01L 25/18 |

FOREIGN PATENT DOCUMENTS

| | | | |
|---|---|---|---|
| JP | 2006225545 A | | 8/2006 |
| JP | 3950241 B2 | | 7/2007 |
| JP | 2008169327 A | * | 7/2008 |
| JP | 2009132834 A | * | 6/2009 |
| JP | 2011080017 A | | 4/2011 |
| JP | 2012219262 A | | 11/2012 |
| JP | 2013093315 A | * | 5/2013 |
| JP | 2013186976 A | | 9/2013 |
| JP | 5636462 B | | 12/2014 |
| JP | 5754073 B2 | | 7/2015 |
| JP | 2016069433 A | | 5/2016 |
| JP | 2016210849 A | | 12/2016 |
| JP | 2017008145 A | | 1/2017 |
| JP | 2017179090 A | | 10/2017 |
| WO | 2015046333 A1 | | 4/2015 |
| WO | 2015129670 A1 | | 9/2015 |
| WO | WO-2015129670 A1 | * | 9/2015 ......... H01L 51/5253 |
| WO | 2016158523 A1 | | 10/2016 |

OTHER PUBLICATIONS

International Search report and Written Opinion of International Application No. PCT/JP2017/030905 dated Nov. 21, 2017; 16pp.

* cited by examiner

*Primary Examiner* — Randy P Gulakowski
*Assistant Examiner* — Ha S Nguyen
(74) *Attorney, Agent, or Firm* — Kanesaka Berner and Partners LLP

(57) ABSTRACT

A curable composition of the present invention includes a cationic polymerizable compound; a thermal polymerization initiator; and a storage stabilizer, in which the cationic polymerizable compound includes at least two selected from the group consisting of a glycidyl ether compound, an alicyclic epoxy compound, and an oxetane compound, a content of the thermal polymerization initiator is from 0.3 to 3 parts by mass with respect to 100 parts by mass of the cationic polymerizable compound, and chain curing is enabled by thermal energy generated by a polymerization reaction of the cationic polymerizable compound.

20 Claims, 5 Drawing Sheets

CURABLE COMPOSITION, CURABLE PASTE MATERIAL, CURABLE SHEET MATERIAL, CURABLE MODELING MATERIAL, CURING METHOD, AND CURED PRODUCT

RELATED APPLICATIONS

The present application is a National Phase of International Application Number PCT/JP2017/030905 filed Aug. 29, 2017.

TECHNICAL FIELD

The present invention relates to a curable composition, a curable paste material, a curable sheet material, a curable modeling material, a curing method, and a cured product.

BACKGROUND ART

A gap is generated between parts due to single part tolerance and structural assembly tolerance. A shim is inserted into the generated gap. The following methods are used to produce the shim that reproduces the gap.
(1) Measuring a gap with a filler gauge.
(2) Applying contact-type or non-contact-type gap measuring devices (Gap Master or the like).
(3) Modeling with an epoxy resin.

Among the methods described above, in a case where a complicated 3D shape modeling or a highly accurate shim shape is required, the method (3) is applied from the viewpoint of gap measurement accuracy.

In the method (3), a great deal of time is required for shim production, such as resin preparation, a coating operation, a resin curing time, and a cured resin measurement operation. In order to achieve high-rate production in the future, shortening the time until the shim production is an issue. However, a dramatic reduction in time cannot be expected due to the contradictory relationship between the length of the pot life of the resin and the short curing time. That is, a resin having a short curing time also has a short pot life, and a pot life sufficient for performing the coating operation cannot be secured. Therefore, a resin having a short curing time cannot be employed. In addition, in the modeling, it is generally required that a surface temperature of a target structural member does not deviate from the allowable temperature. The allowable temperature of the seal bonding surface to which the sealing material is applied is, for example, lower than 60° C., and the allowable temperature of the primer application surface to which the primer is applied is, for example, lower than 93° C. Therefore, a dramatic effect cannot be expected even in a method for accelerating resin curing such as curing by heating, and sufficient time reduction is in a severe situation.

However, Patent Document 1 proposes a composition including an aromatic epoxy compound, an alicyclic epoxy compound or an aliphatic epoxy compound, and a polyfunctional aliphatic oxetane compound as a cationic polymerizable organic substance mixture, in which the aromatic epoxy compound is a main component. Patent Document 1 also discloses that this composition contains a cationic polymerization initiator. The cationic polymerization initiator is used at a ratio from 7 to 10 parts by mass with respect to 100 parts by mass of the cationic polymerizable organic substance mixture.

Patent Document 1 does not disclose use of the composition for shim production. The composition disclosed in Patent Document 1 needs to be heated at 130° C. to 180° C. when cured, and deviates from the above allowable temperature.

CITATION LIST

Patent Document

Patent Document 1: WO2016/158523

SUMMARY OF INVENTION

Technical Problem

An object of the present invention is to provide a curable composition that can secure a sufficiently long pot life, and can be quickly cured even at a temperature of 65° C. or lower after the pot life has passed, a curable paste material using the same, a curable sheet material, a curable modeling material, a curing method, and a cured product.

Solution to Problem

The present invention has the following aspects.

[1] A curable composition including a cationic polymerizable compound, a thermal polymerization initiator, and a storage stabilizer,
wherein the cationic polymerizable compound includes at least two selected from the group consisting of a glycidyl ether compound, an alicyclic epoxy compound, and an oxetane compound,
a content of the thermal polymerization initiator is from 0.3 to 3 parts by mass with respect to 100 parts by mass of the cationic polymerizable compound, and
chain curing is enabled by thermal energy generated by a polymerization reaction of the cationic polymerizable compound.

[2] The curable composition according to [1], wherein the chain curing is enabled at a temperature of 65° C. or lower.

[3] The curable composition according to [1] or [2], further including a filler.

[4] The curable composition according to any one of [1] to [3], wherein a pot life at room temperature is 20 minutes or longer.

[5] The curable composition according to any one of [1] to [4], wherein the glycidyl ether compound is at least one selected from the group consisting of a bisphenol A type diglycidyl ether compound and a bisphenol F type diglycidyl ether compound,
the alicyclic epoxy compound is 3,4-epoxycyclohexylmethyl-3,4-epoxycyclohexanecarboxylate, and
the oxetane compound is at least one selected from the group consisting of 4,4'-bis[(3-ethyl-3-oxetanyl)methoxymethyl]biphenyl and 3-ethyl-3-hydroxymethyloxetane.

[6] The curable composition according to any one of [1] to [5], wherein the thermal polymerization initiator is at least one selected from the group consisting of sulfonium salts represented by the following Formula (I-1) or (I-2).

[Chem. 1]

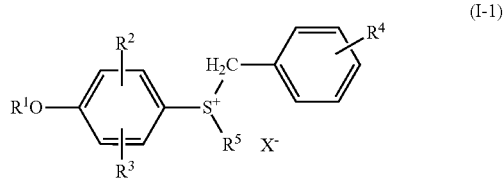

-continued

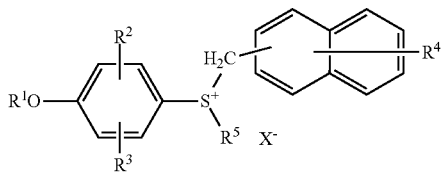

(I-2)

Here, $R^1$ represents a hydrogen atom, a methyl group, an acetyl group, or a methoxycarbonyl group, $R^2$ and $R^3$ each independently represents a hydrogen atom, a halogen atom, or an alkyl group having 1 to 4 carbon atoms, and $R^4$ represents a hydrogen atom, a halogen atom, a nitro group, a methyl group, or a methoxy group, $R^5$ represents an alkyl group having 1 to 4 carbon atoms, and X represents $SbF_6$, $PF_6$, $AsF_6$ or $BF_4$.

[7] The curable composition according to any one of [1] to [6], wherein the storage stabilizer is at least one selected from the group consisting of sulfonium salts represented by Formula (II) below.

[Chem. 2]

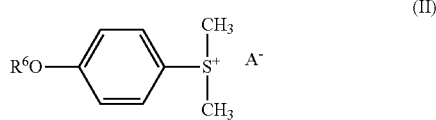

(II)

Here, $R^6$ represents an acetyl group or a methoxycarbonyl group, and A represents $CH_3SO_4$.

[8] The curable composition according to any one of [1] to [7], wherein a content of the storage stabilizer is from 0.3 to 5 parts by mass with respect to 100 parts by mass of the thermal polymerization initiator.

[9] A curable paste material including the curable composition described in any one of [1] to [8].

[10] A curable sheet material including the curable composition described in any one of [1] to [8].

[11] A curable modeling material including the curable composition described in any one of [1] to [8].

[12] A curing method of curing the curable composition described in any one of [1] to [8], the curable paste material described in [9], the curable sheet material described in [10], or the curable modeling material described in [11] at a temperature of 65° C. or lower.

[13] A cured product obtained by curing the curable composition described in any one of [1] to [8], the curable paste material described in [9], the curable sheet material described in [10], or the curable modeling material described in [11].

[14] The cured product according to [10], wherein a hardness is 60 Hs or higher.

Advantageous Effect of Invention

According to the present invention, it is possible to provide a curable composition that can secure a sufficiently long pot life, and can be quickly cured even at a temperature of 65° C. or lower after the pot life has passed, a curable paste material using the same, a curable sheet material, a curable modeling material, a curing method, and a cured product.

DESCRIPTION OF EMBODIMENTS

Curable Composition

Figure 1:
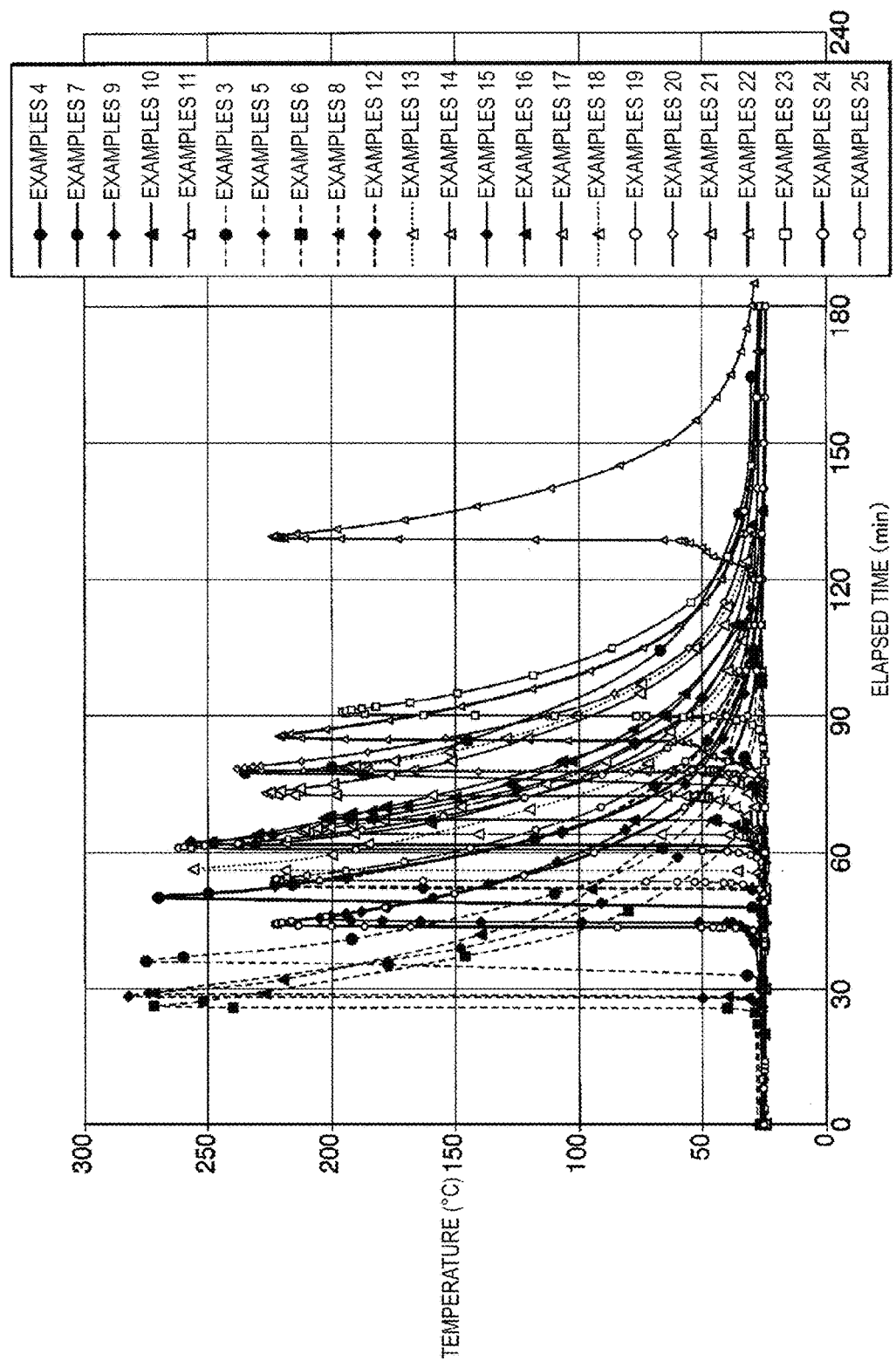
FIG. 1 is a graph illustrating a relationship between a temperature and an elapsed time from the start of heating of curable compositions of Examples 3 to 25.

The curable composition of the present invention contains a cationic polymerizable compound, a thermal polymerization initiator, and a storage stabilizer.

The curable composition of the present invention may further contain a filler.

The curable composition of the present invention can further contain other components in addition to the cationic polymerizable compound, the thermal polymerization initiator, the storage stabilizer, and the filler, as necessary, as long as the effects of the present invention are not impaired.

Cationic Polymerizable Compound

The cationic polymerizable compound includes at least two selected from the group consisting of a glycidyl ether compound, an alicyclic epoxy compound, and an oxetane compound.

The cationic polymerizable compound may further contain other cationic polymerizable compounds in addition to the glycidyl ether compound, the alicyclic epoxy compound, and the oxetane compound.

The total content of the glycidyl ether compound, alicyclic epoxy compound, and oxetane compound in the cationic polymerizable compound is preferably from 50% to 100% by mass, and more preferably from 80% to 100% by mass, with respect to the total mass of the cationic polymerizable compound.

Note that, in the present specification and claims, "to" indicating a numerical range and means including numerical values described before and after "to" as a lower limit value and an upper limit value.

The glycidyl ether compound has one or more glycidyl ether groups.

Examples of the glycidyl ether compound include a bisphenol A type diglycidyl ether compound, a bisphenol F type diglycidyl ether compound, a hydrogenated bisphenol type glycidyl ether compound, other aromatic glycidyl ether compounds, and aliphatic glycidyl ether compounds. These glycidyl ether compounds may be used alone or two or more thereof may be used in combination.

Particularly, the glycidyl ether compound is preferably at least one selected from the group consisting of a bisphenol A type diglycidyl ether compound and a bisphenol F type diglycidyl ether compound from the viewpoints of availability, heat resistance, rigidity, strength characteristics, versatility, low cost, and the like.

The alicyclic epoxy compound has one or more alicyclic epoxy groups. An alicyclic epoxy group is an epoxy group in a state in which one oxygen atom is bonded to two carbon atoms (usually carbon atoms adjacent to each other) among the cyclically bonded carbon atoms forming an aliphatic ring of the alicyclic compound.

Examples of the alicyclic epoxy compounds include dicyclopentadiene dioxide, limonene dioxide, di(3,4-epoxycyclohexyl) adipate, (3,4-epoxycyclohexyl)methyl-3,4-epoxycyclohexanecarboxylate, 3,4-epoxy-6-methylcyclohexylmethyl-3,4-epoxy-6-methylcyclohexan ecarboxylate, and ethylene-1,2-di(3,4-epoxycyclohexanecarboxylic acid) ester. These alicyclic epoxy compounds may be used alone or two or more thereof may be used in combination.

As the alicyclic epoxy compound, 3,4-epoxy-6-methyl-cyclohexylmethyl-3,4-epoxy-6-methylcyclohexanecarboxylate is particularly preferably used from the viewpoint of high reactivity, heat resistance, rigidity, strength characteristics, versatility, availability, low cost, and the like.

The oxetane compound has one or more oxetane groups.

Examples of the oxetane compound include 3-ethyl-3-hydroxymethyloxetane (hereinafter, also referred to as "EHO"), a bisphenol A type oxetane compound, a bisphenol oxetane compound, a bisphenol S type oxetane compound, a xylylene type oxetane compound, a phenol novolak type oxetane compound, a cresol novolak type oxetane compound, an alkylphenol novolak type oxetane compound, a biphenol type oxetane compound, a bixylenol type oxetane compound, a naphthalene type oxetane compound, a dicyclopentadiene type oxetane compound, and an oxetaneated product of a condensation of phenols with aromatic aldehydes having a phenolic hydroxyl group. These oxetane compounds may be used alone or two or more thereof may be used in combination.

The oxetane compound is preferably at least one selected from the group consisting of 4,4'-bis[(3-ethyl-3-oxetanyl) methoxymethyl] biphenyl (hereinafter, also referred to as "OXBP") and EHO from the viewpoint of high reactivity. OXBP is preferable from the viewpoint of that the heat resistance of the cured product is more excellent. EHO is preferable from the viewpoint of being inexpensive.

Examples of other cationic polymerizable compounds include epoxidized olefin and a vinyl ether compound.

Examples of the epoxidized olefin include epoxidized linseed oil, epoxidized castor oil, and epoxidized soybean oil.

Examples of the vinyl ether compound include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

Any one of these other cationic polymerizable compounds may be used alone, or two or more thereof may be used in combination.

In a preferable embodiment of the curable composition of the present invention, the cationic polymerizable compound contains at least one glycidyl ether compound, at least one alicyclic epoxy compound, and at least one oxetane compound.

Among these compounds, since the glycidyl ether compound has a relatively low polymerization reactivity, the cationic polymerizable compound containing the glycidyl ether compound can suppress the curing speed from becoming too fast. Further, since the glycidyl ether compound is relatively inexpensive, the cost can be reduced. Since the alicyclic epoxy compound has a relatively high polymerization reactivity, when the cationic polymerizable compound contains the alicyclic epoxy compound, the calorific value per unit time is increased, and the chain curing easily proceeds. The oxetane compound has high cationic polymerization reactivity similar to the alicyclic epoxy and the calorific value per unit time is increased. Therefore, the cationic polymerizable compound contains the oxetane compound, which can help facilitate the chain curing.

In the above preferable embodiment, the content of the glycidyl ether compound is preferably from 10% to 80% by mass, more preferably from 20% to 60% by mass, still more preferably from 30% to 50% by mass, and particularly preferably from 35% to 45% by mass, with respect to the total mass of the cationic polymerizable compound. In a case where the content of the glycidyl ether compound is the above lower limit value or more, more excellent initial reaction stability, an effect of suppressing an increase in the curing speed, and physical properties can be obtained. Further, the cost becomes lower. If the content of the glycidyl ether compound is the above upper limit value or less, more excellent chain curing reactivity can be obtained.

The content of the alicyclic epoxy compound is preferably from 10% to 80% by mass, more preferably from 20% to 60% by mass, still more preferably from 25% to 45% by mass, and particularly preferably from 30% to 40% by mass, with respect to the total mass of the cationic polymerizable compound. If the content of the alicyclic epoxy compound is the above lower limit value or more, more excellent chain curing reactivity can be obtained. If content of an alicyclic epoxy compound is the above upper limit value or less, the more excellent initial reaction stability, and the effect of the increase in the curing speed can be obtained.

The content of the oxetane compound is preferably from 5% to 70% by mass, more preferably from 10% to 50% by mass, still more preferably from 15% to 35% by mass, and particularly preferably from 20% to 30% by mass, with respect to the total mass of the cationic polymerizable compound. In a case where the content of the oxetane compound is the above lower limit value or more, more excellent chain curing reactivity can be obtained. In a case where content of the oxetane compound is the above upper limit value or less, the more excellent initial reaction stability, and the effect of the increase in the curing speed can be obtained.

In a more preferable embodiment of the curable composition of the present invention, the cationic polymerizable compound contains at least one glycidyl ether compound selected from the group consisting of a bisphenol A type diglycidyl ether compound and a bisphenol F type diglycidyl ether compound; and at least one oxetane compound selected from the group consisting of 3,4-epoxy-6-methyl-cyclohexylmethyl-3,4-epoxy-6-methylcyclohexanecarboxylate and OXBP and EHO.

In the above preferable embodiment, the preferable ranges of the contents of the glycidyl ether compound and the oxetane compound are the same as described above. The preferable range of the content of 3,4-epoxy-6-methylcyclohexylmethyl-3,4-epoxy-6-methylcyclohexanecarboxylate is the same as the preferable range of the content of the alicyclic epoxy compound.

In a case where both OXBP and EHO are included, the content of OXBP is preferably from 5% to 50% by mass, more preferably from 5% to 40% by mass, still more preferably from 10% to 30% by mass, and particularly preferably from 15% to 25% by mass, with respect to the total mass of the cationic polymerizable compound. In a case where the content of OXBP is the above lower limit value or greater, more excellent chain curing reactivity, the heat resistance, and the rigidity can be obtained. If the content of OXBP is the above upper limit value or less, more excellent initial reaction stability and the effect of the increase in the curing speed can be obtained. Further, the cost becomes lower.

In a case where both OXBP and EHO are included, the content of EHO is preferably from 5% to 40% by mass, more preferably from 5% to 25% by mass, still more preferably from 5% to 15% by mass, and particularly preferably from 5% to 10% by mass, with respect to the total mass of the cationic polymerizable compound. In a case where the content of the EHO is the above lower limit value or more, more excellent chain curing reactivity can be obtained. Further, the cost becomes lower. In a case where the content of EHO is the above upper limit value or less, more excellent initial reaction stability, the effect of the increase in the curing speed, and the heat resistance can be obtained.

In a further preferable embodiment of the curable composition of the present invention, the cationic polymerizable compound contains a bisphenol A type diglycidyl ether compound, 3,4-epoxy-6-methylcyclohexylmethyl-3,4-epoxy-6-methylcyclohexanecarboxylate, OXBP, and EHO.

In the further preferable embodiment, the preferable range of the content of the bisphenol A type diglycidyl ether compound is the same as the preferable range of the content of the glycidyl ether compound. The preferable ranges of the contents of 3,4-epoxy-6-methylcyclohexylmethyl-3,4-epoxy-6-methylcyclohexanecarboxylate, OXBP, and EHO are the same as described above.

Thermal Polymerization Initiator

The thermal polymerization initiator is a compound that can be decomposed by heat so as to generate Lewis acid or protonic acid. The polymerization reaction of the cationic polymerizable compound is initiated by the action of the Lewis acid or the protonic acid.

The thermal polymerization initiator is preferably a compound capable of decomposing at a temperature of 65° C. or lower and generating the Lewis acid or the protonic acid from the viewpoint of enabling the chain curing of the curable composition at a temperature of 65° C. or lower. Examples of such a compound include a sulfonium salt represented by Formula (I-1) below and a sulfonium salt represented by Formula (I-2) below. Any one of these thermal polymerization initiators may be used alone, or two or more thereof may be used in combination.

[Chem. 3]

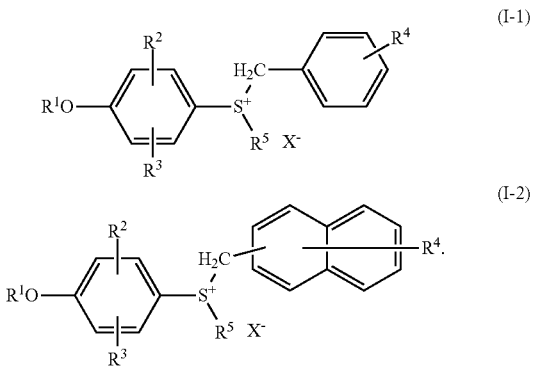

Here, $R^1$ represents a hydrogen atom, a methyl group, an acetyl group (CH$_3$CO), or a methoxycarbonyl group (CH$_3$OCO), $R^2$ and $R^3$ each independently represents a hydrogen atom, a halogen atom, or an alkyl group having 1 to 4 carbon atoms, and $R^4$ represents a hydrogen atom, a halogen atom, a nitro group, a methyl group, or a methoxy group, $R^5$ represents an alkyl group having 1 to 4 carbon atoms, and X represents SbF$_6$, PF$_6$, AsF$_6$ or BF$_4$.

The thermal polymerization initiator is preferably at least one selected from the group consisting of sulfonium salts represented by the above Formula (I-1) or (I-2) from the viewpoint of chain curing characteristics.

Preferably, as the sulfonium salt represented by the Formula (I-1) or (I-2), $R^1$ is a hydrogen atom, an acetyl group, or a methoxycarbonyl group, $R^2$ and $R^3$ are each a hydrogen atom, and $R^4$ is a sulfonium salt in which is a hydrogen atom, a halogen atom, a nitro group, or a methyl group, and $R^5$ is a sulfonium salt which is a methyl group. Preferably, among them, represented by the Formula (I-1), $R^1$ is a methoxycarbonyl group, $R^2$ and $R^3$ are each a hydrogen atom, $R^4$ is a hydrogen atom, $R^5$ is a methyl group, X Is a sulfonium salt in which SbF$_6$, that is, a sulfonium salt represented by the following Formula (I-1-1).

[Chem. 4]

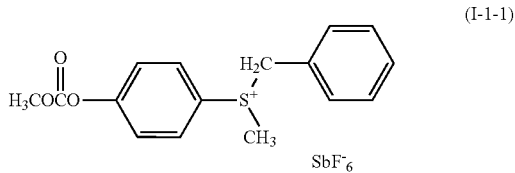

Storage Stabilizer

The storage stabilizer is a compound that can capture the Lewis acid or the protonic acid generated by the decomposition of the thermal polymerization initiator. When the curable composition contains the storage stabilizer, the polymerization of the cationic polymerizable compound is suppressed, and the pot life of the curable composition becomes long.

Examples of the storage stabilizer include a sulfonium salt represented by Formula (II) below. Any one of these storage stabilizers may be used alone, or two or more thereof may be used in combination.

[Chem. 5]

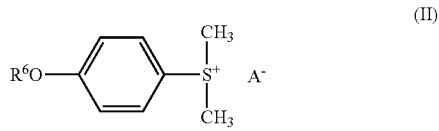

Here, $R^6$ represents an acetyl group or a methoxycarbonyl group, and A represents CH$_3$SO$_4$.

The storage stabilizer is preferably at least one selected from the group consisting of sulfonium salts represented by Formula (II) above from the viewpoint of the storage stabilizer characteristics.

(Filler)

The filler used for adjusting properties such as the viscosity of the curable composition, reducing the calorific value during curing by reducing the proportion of the cationic polymerizable compound, suppressing curing shrinkage or improving dimensional stability, improving hardness, and improving rigidity.

Examples of the filler include glass, silica, ceramic, plastic, and metal. At least one selected from the group consisting of glass, silica, and ceramic is preferable from the viewpoint of the property stability, the dispersibility, the availability, the variety in shape and performance, and the low cost.

Examples of the filler forms include powder, fiber, and flake, ease of mixing and preparation, the powder is preferable from the viewpoint of ease of fitting into the shape (fillability in gaps, shape followability during crushing, and the like).

The powdery filler may have a distribution in particle size.

The average particle size of the powdery filler is preferably 200 μm or less, more preferably 50 μm or less, further preferably 20 μm or less, and particularly preferably 5 μm or less. When the average particle size is the above upper limit value or less, the miscibility with the cationic polymerizable compound or the like, the ease of fitting into the shape, and the like are more excellent. The lower limit of the average particle size is not particularly limited, and may be, for example, less than 1 μm. The average particle size is measured by a particle size distribution measuring device or the like.

In order to control the viscosity characteristics of the curable composition, a plurality of powdery fillers having different average particle sizes may be used in combination.

As the filler, powdery silica is preferable from the viewpoint of that products which are is inexpensive and have various particle sizes are commercially available and the particle size can be easily selected.

Other Components

Examples of other components include a sensitizer, a curing accelerator, a pigment/dye, an antifoaming agent, and a viscosity modifier. Any one of these other components may be used alone, or two or more thereof may be used in combination.

Content of Each Component

The content of the thermal polymerization initiator in the curable composition is from 0.3 to 3 parts by mass, preferably from 0.5 to 2 parts by mass, and particularly preferably from 0.75 to 1.5 parts by mass, with respect to 100 parts by mass of the cationic polymerizable compound. The content of the thermal polymerization initiator is a solid content conversion amount. When the content of the thermal polymerization initiator is the above lower limit value or more, the chain curing is possible, and the curing speed after the initiation of curing is sufficiently high. Even if the content of the thermal polymerization initiator exceeds the above upper limit value, the effect of improving the curing speed is hardly seen, resulting in an increase in cost.

The content of the storage stabilizer in the curable composition can be appropriately set in consideration of the desired pot life and curing time of the curable composition. As the content of the storage stabilizer is increased, the initiation of the polymerization reaction of the cationic polymerizable compound tends to be delayed, and the pot life and the curing time tend to be longer.

For example, in a case where the pot life at room temperature is 20 minutes or longer, the content of the storage stabilizer in the curable composition is preferably 0.3 parts by mass or more with respect to 100 parts by mass of the thermal polymerization initiator.

The content of the storage stabilizer is preferably from 0.3 to 5 parts by mass, more preferably 1 to 4 parts by mass, and particularly preferably from 1.5 to 3.5 parts by mass with respect to 100 parts by mass of the thermal polymerization initiator, from the balance of the pot life and the curing time.

In a case where the curable composition contains a filler, the filler content is preferably 50% by mass or greater, more preferably 60% by mass or greater, still more preferably 70% by mass or greater, and particularly preferably 75% by mass or greater with respect to the total mass of the curable composition. The upper limit of the filler content changes also with the density of the filler, for example, it may be 80% by mass with respect to the total mass of the curable composition, for example.

The content of other components in the curable composition may be, for example, 0% to 20% by mass with respect to the total mass of the curable composition.

The curable composition of the present invention can be subject to chain curing by thermal energy generated by the polymerization reaction (exothermic polymerization reaction) of the cationic polymerizable compound.

The "chain curing" is a curing form in which self-reaction thermal energy is used as a drive force. When the thermal energy (primary thermal energy) is applied to a part of the curable composition, an initial exothermic polymerization reaction occurs, and thermal energy (secondary thermal energy) is generated accordingly. The thermal energy (secondary thermal energy) generated by the initial exothermic polymerization reaction continuously repeats the exothermic polymerization reaction and the secondary thermal energy accordingly generated, and the curing of the curable composition proceeds in a chain manner so as to cure the entire curable composition.

Whether or not the curable composition can be chain-cured can be determined by the following procedure.

A cylindrical mold having a length of 200 mm and D10 mm is filled with the curable composition to make a sample (for example, a plug with one end of a resin tube/resin hose, a test tube or the like is used as a casting mold). A soldering iron adjusted to an any temperature (primary thermal energy application temperature) is brought into contact as a heat source at a position of an upper end portion (where contact with the curable composition is possible) of the sample. If the curable composition can be chain-cured, the exothermic polymerization reaction occurs after contact with the heat source, and curing proceeds in the longitudinal direction of the sample by secondary thermal energy generated by the exothermic polymerization reaction, so that the entire sample is cured. The cured portion can be confirmed by visual observation, temperature measurement at each point in the longitudinal direction, or the like.

In the curable composition of the present invention, it is preferable that the chain curing is enabled at a temperature of 65° C. or lower. In a case where the temperature at which the chain curing is enabled at 65° C. or lower, the mold can be taken without deviating from the allowable temperature required for shim manufacture.

The temperature at which the chain curing is enabled is a temperature at which the first exothermic polymerization reaction in the chain curing occurs, that is, a temperature at which the chain curing can be started. The temperature of the curable composition may exceed the upper limit of the temperature at which the chain curing is enabled by the secondary thermal energy after starting the chain curing.

The temperature at which the chain curing can be started is more preferably 45° C. or lower.

The lower limit of the temperature at which the chain curing can be started is not particularly limited, and can be appropriately selected in consideration of the balance with the pot life. As the temperature at which the chain curing can be started is high, the pot life tends to be longer. Therefore, from the viewpoint of securing the pot life, it is preferable that the temperature at which the chain curing can be started is high. The temperature at which the chain curing can be started may be, for example, 0° C. or higher, 5° C. or higher, 10° C. or higher, 15° C. or higher, and 20° C. or higher.

The temperature at which the chain curing can be started is particularly preferably about room temperature (RT). Here, "room temperature" indicates a temperature within 23±3° C.

The temperature at which the chain curing can be started can be adjusted depending on the type of the thermal polymerization initiator.

In the curable composition of the present invention, the pot life at room temperature is preferably 20 minutes or longer, more preferably 30 minutes or longer, further preferably 45 minutes or longer, and particularly preferably 60 minutes or longer.

The pot life indicates the time until the material can be handled in the handling environment (room temperature).

When the pot life at room temperature is the above lower limit value or more, it is possible to complete an operation such as a coating operation in mold making while the curable composition is soft.

The pot life of the curable composition at room temperature is preferably 20 minutes or longer, more preferably 30 minutes or longer, further preferably 45 minutes or longer, and particularly preferably 60 minutes or longer.

The pot life of the curable composition can be adjusted depending on the content of the storage stabilizer, the type of the polymerization initiator, the type of the cationic polymerizable resin component, the amount of filler added, and the like.

The curing time of the curable composition at room temperature of the present invention is preferably (pot life at room temperature+6 hours) or less, more preferably (pot life at room temperature+2 hours) or less. For example, in a case where the pot life at room temperature is 60 minutes, it is preferably 7 hours or less, and more preferably 3 hours or less.

The curing time of the curable composition of the present invention at 60° C. is preferably 3 hours (excluding pot life) or less, and more preferably 1 hour (excluding pot life) or less.

The curing time indicates a time from the time when the primary thermal energy is applied to the curable composition (from the time of exposure in a room temperature environment in a case of room temperature curing) to the time when the curable composition is cured and has predetermined physical properties. The time when the curable composition is completely cured indicates a time when it has predetermined physical properties and changes in physical properties due to the curing reaction are eliminated.

In addition, the curing time when actually curing the curable composition varies depending on the primary thermal energy (temperature) applied to the curable composition, the ambient temperature, and the like.

The viscosity at room temperature of the curable composition of the present invention is preferably 100 Pa·s or more, and more preferably 1000 Pa·s or more. When modeling the gap between the structures, a pressure is applied to the curable composition (modeling material) to deform it. When the viscosity is the above lower limit value or more, the mold can be taken sufficiently. On the other hand, a structural member (made of aluminum, titanium, carbon fiber reinforced plastic (CFRP), or the like) to be sandwiched differs depending on member rigidity, and the sandwiched structural member preferably has a viscosity that does not deform. For example, the viscosity is preferably 5000 Pa·s or less is preferable.

The viscosity is a value measured by a B-type viscometer. Note that, similar measurement values can be obtained by a viscoelasticity measuring apparatus.

The viscosity can be adjusted by the filler content, the cationic polymerizable resin component, and the like. For example, as the filler content is increased, the viscosity tends to be increased.

The hardness when the curable composition of the present invention is cured, that is, the hardness of the cured product is preferably 30 Hs or higher, and more preferably 60 Hs or higher. During a modeling operation or a handling operation, the cured product is processed or transported (handling), and the shape is measured. When the hardness of the cured product is 30 Hs or higher, handling during each operation is possible, and the cured product is not easily deformed. When the hardness of the cured product is 60 Hs or higher, it is difficult to deform even in a large-size modeling operation. The upper limit of the hardness of cured product is not particularly limited, and for example, it may be 80 Hs.

The hardness (Shore hardness) is measured by a hardness meter.

The hardness can be adjusted by the filler filling amount, the cationic polymerizable resin component, and the like. For example, as the filler filling amount is increased, the hardness tends to be increased.

Method for Preparing Curable Composition

The curable composition can be adjusted by mixing a cationic polymerizable compound, a thermal polymerization initiator, a storage stabilizer, and, if necessary, a filler and other components.

The mixing is usually performed at a temperature lower than the temperature at which the chain curing of the curable composition is enabled. The mixing of the polymerization initiator is preferably performed at (temperature at which the chain curing can be started: −10° C.) or lower, more preferably (temperature at which the chain curing can be started: −15° C.) or lower, and still more preferably (temperature at which the chain curing can be started: −20° C.) or lower. Therefore, for example, in a case where the curable composition can start chain curing at 30° C., the mixing temperature of the polymerization initiator is preferably 5° C. to 20° C., and more preferably 10° C. to 15° C. When the mixing temperature is the upper limit value or less, it is possible to suppress that chain curing advances at the time of mixing. When the mixing temperature is the above lower limit value or more, it is easy to mix the materials.

The mixing method is not particularly limited, and a known mixing method can be used. However, since heat is generated depending on the mixing method, it is necessary to work with attention to this.

The order of mixing the components is not particularly limited, and all the components may be mixed together or sequentially, but after the polymerization initiator is mixed, it is necessary to keep the temperature (or lower) at which the polymerization initiator is mixed. From the above, the order of mixing is preferably the order of mixing described below from the viewpoint of ease of handling.

In a case where the curable composition contains the filler, it is preferable that the thermal polymerization initiator and the storage stabilizer are mixed to form a first mixture, the cationic polymerizable compound and the filler are mixed to form a second mixture, and the first mixture and the second mixture are mixed. When the filler is blended, the viscosity becomes high and unevenness in the concentration of the thermal polymerization initiator or the like tends to occur during mixing. When a portion having a low storage stabilizer with respect to the thermal polymerization initiator is locally generated, the polymerization reaction may start at that portion. By mixing in the above order, it is possible to suppress the occurrence of a region where the storage stabilizer is small with respect to the thermal polymerization initiator locally.

The prepared curable composition is typically in a paste form. The paste-form curable composition can be used as a curable paste material.

The prepared curable composition may be molded in a sheet form. The sheet-form curable composition can be used as a curable sheet material.

A film material such as a resin film may be laminated on one side or both sides of a sheet-form curable composition (a layer made of the curable composition). A laminate in which a film material is laminated on one side or both sides of a sheet-form curable composition can also be used as the curable sheet material.

In a case where a storage period is provided after the curable composition, the curable paste material, or the curable sheet material is manufactured and before being cured, as a storage method, frozen storage is preferable.

A storage temperature in the frozen storage is preferably −15° C. or lower, more preferably −40° C. or lower, and particularly preferably −55° C. or lower. The lower limit of the storage temperature is not particularly limited, and may be, for example, −65° C. or lower.

A curable composition of the present invention includes a cationic polymerizable compound, a thermal polymerization initiator, and a storage stabilizer, in which the cationic polymerizable compound includes at least two selected from the group consisting of a glycidyl ether compound, an alicyclic epoxy compound, and an oxetane compound, a content of the thermal polymerization initiator is from 0.3 to 3 parts by mass with respect to 100 parts by mass of the cationic polymerizable compound, and chain curing is enabled by thermal energy generated by a polymerization reaction of the cationic polymerizable compound so that sufficiently long pot life can be secured. Further, it can be rapidly cured even at a temperature of 65° C. or lower after the pot life has elapsed.

The reason why a sufficiently long pot life can be secured is mainly as follows. That is, when the curable composition of the present invention is placed in a working environment or a handling environment (under the ambient temperature of the pot life), the thermal polymerization initiator is decomposed even if it is slight, and the Lewis acid or the protonic acid is appear. Most of the Lewis acid or the protonic acid generated within the pot life is trapped by the storage stabilizer, the exothermic polymerization reaction does not occur or slightly occurs, and the chain curing does not start. In addition, even with the thermal energy generated by the slight exothermic polymerization reaction, in a case where some of them are absorbed by a highly stable glycidyl ether type compound or the like, the chain curing does not start. This effect is particularly high in a case of containing the filler. Since the storage stabilizer is consumed by the capture of the Lewis acid or the protonic acid, in a case where the amount of the generated Lewis acid or proton acid exceeds the amount of the storage stabilizer, the secondary thermal energy is sufficiently generated so that the chain curing proceeds by an exothermic polymerization reaction of the cationic polymerizable compound. This secondary thermal energy initiates the chain curing, and the entire curable composition is cured.

The use of the curable composition of the present invention is not particularly limited. For example, it can be used for a curable modeling material, a curable sheet material, a curable paste material, a potting material, a casting material, an adhesive, a paint, a coating agent, and the like.

It is desirable that the curable modeling material used to make shims placed in gaps between structural members, such as the gap between main wings and engine nacelle of an aircraft, have a short curing time while securing a certain pot life. Further, it may be desired to satisfy the following conditions 1 to 7. The curable composition of the present invention can satisfy these conditions. Therefore, as a use of the curable composition of the present invention, the curable modeling material for producing the shim disposed in the gap between structural members is suitable.

Condition 1: Suppression of Material Temperature Due to Reaction Heat During Curing It is required that the surface temperature of the structural member does not deviate from the allowable temperature due to the reaction heat at the time of curing the modeling material. The allowable temperature of the seal bonding surface to which the sealing material is applied is typically lower than 60° C., and the allowable temperature of the primer application surface to which the primer is applied is typically lower than 93° C.

Condition 2: Influence on Drilling Hole by Cured Resin

The shim is often manufactured with a positive hole. In this case, the modeling material is drilled together with the structural member after being cured to some extent. It is required that the modeling material does not affect the drill blade when drilling and does not reduce the processing accuracy.

Condition 3: Hardness at which Cured Product does not Deform

Since the modeling material after curing is directly transported and the shape is measured by FARO ARM, the shape is required to be maintained without deforming in each operation.

Condition 4: Reduction of Curing Time in Low Temperature Region

As an example, there is a pot life of about 1 hour under the temperature condition that satisfies Condition 1, and after 1 hour from the start of curing, it is cured to such an extent that drilling can be performed (for example, hardness of 30 Hs or higher), and 6 hours after the start of curing, it is desired to be completely cured and have a hardness of 60 Hs or higher.

Condition 5: Viscosity at which Structural Member is not Deformed During Modeling When modeling a gap between the structural members, a certain pressure is applied to the modeling material. In that case, it is required to have viscosity that does not deform the sandwiched structural member. At the same time, it is required to have sufficient viscosity to perform the modeling.

Condition 6: Material Cost

Due to the demand for shim production costs, the material cost of the modeling material is required to be as low as possible.

Condition 7: Influence on Human Body

Since the modeling operation is handled directly by a worker, it is required not to contain any material that affects the human body from the viewpoint of safety.

Curable Paste Material

The curable paste material of the present invention contains the curable composition of the present invention.

The curable paste material of the present invention can be used for the same use as the curable composition of the present invention.

Curable Sheet Material

The curable sheet material of the present invention contains the curable composition of the present invention.

Examples of the curable sheet material include a sheet made of the curable composition of the present invention, a sheet in which a film substrate such as a resin film is laminated on one side or both sides of a layer made of the curable composition of the present invention, and the like.

The curable sheet material of the present invention can be used for the same use as the curable composition of the present invention.

Curable Modeling Material

The curable modeling material of the present invention contains the curable composition of the present invention.

The form of the curable modeling material of the present invention is not particularly limited, and may be, for example, a paste form or a sheet form. The above-mentioned curable paste material of the present invention can be used as a paste-form curable modeling material. The above-mentioned curable sheet material of the present invention can be used as a sheet form curable modeling material.

Examples of targets for modeling with the curable modeling material of the present invention include a gap between structural members, a tooth mold, a bush gap, and sealing or hole filling, and the gap between structural members is preferable.

Curing Method, Cured Product

The above-mentioned curable composition, curable paste material, curable sheet material, or modeling material (hereinafter, collectively referred to as "curable composition or the like") can be cured to obtain a cured product. If an optional shape is imparted to the curable composition or the like before curing, a cured product having the optional shape is obtained.

The curable composition or the like can be cured by applying thermal energy (primary thermal energy) to a part of the curable composition or the like.

The method for applying thermal energy is not particularly limited, and examples thereof include a method of placing a curable composition under the condition of the temperature at which the temperature at which the chain curing is enabled and a method of heating a part of the curable composition and the like to a temperature at which the temperature at which the chain curing is enabled with heating means. Examples of the heating means include a dryer, a rod heater, a heater-blanket, an infrared heater, and an oven.

Preferable temperature at which the chain curing is enabled is as described above. Accordingly, the temperature at which the curable composition or the like is cured is preferably 65° C. or lower, more preferably 45° C. or lower, and particularly preferably about room temperature (within 25±3° C.).

After chain curing starts, the curable composition or the like before complete curing may be subjected to processing such as drilling.

The hardness of the curable composition or the like when processing is performed is preferably 30 Hs or higher, and more preferably 60 Hs or higher.

The use of the cured product is not particularly limited. For example, the cured product can be used for a mold for producing shims, a mold for producing bushes, a mold for producing a sealing material or a hole filling material, and both of the materials, a casting material, an adhesive application, a paint application, a coating agent application, and the like.

An example of the shape of a mold for shim producing is a shape having a maximum length of about 2 m, a width of about 0.2 m, and a plate thickness of about from 0.2 to 3 mm.

EXAMPLES

Hereinafter, the present invention will be described in more detail with reference to examples. Note that the present invention is not in any way limited by the working examples described below. "Part" means "part by mass".

The materials used in each example are described below.

Materials to be Used

828: "jER (trade name) 828" available from Mitsubishi Chemical Corporation, bisphenol A type diglycidyl ether compound.

2021P: "CELLOXIDE (trade name) 2021P" available from Daicel Corporation, 3,4-epoxycyclohexylmethyl-3,4-epoxycyclohexanecarboxylate.

OXBP: "ETERNACOLL (trade name) OXBP" available from Ube Industries, Ltd., 4,4'-bis[(3-ethyl-3-oxetanyl)methoxymethyl] biphenyl.

EHO: "ETERNACOLL EHO" available from Ube Industries, Ltd., 3-ethyl-3-hydroxymethyloxetane.

SI-60: Thermal polymerization initiator, "SAN-AID SI-60" available from Sanshin Chemical Industry Co., Ltd., sulfonium salt represented by the above Formula (I-2).

SI-45: Thermal polymerization initiator, "SAN-AID SI-45" available from Sanshin Chemical Industry Co., Ltd., sulfonium salt represented by the above Formula (I-1-1).

SI-B2A: Thermal polymerization initiator, "SAN-AID SI-B2A" available from Sanshin Chemical Industry Co., Ltd.

UVI-6974: Photopolymerization initiator, "UVI-6974" available from Dow Chemical Co., diphenyl [4-(phenylthio)phenyl] sulfonium hexafluoroantimonate (V).

Storage stabilizer: "SI-auxiliary agent" available from Sanshin Chemical Industry Co., Ltd., a compound represented by the above Formula (II).

SI-60, SI-45, SI-B2A, and storage stabilizer were each used as a 50% by mass solution (solvent: γ-butyrolactone), and UVI-6974 was a 50% by mass solution (solvent: propylene carbonate).

EXV-5: Trade name, sold by Lasernet, silica filler.

URE-FIL9: Trade name, silica filler (fumed silica (nanoparticles)).

FB-5D: Trade name, Denka, silica filler, powder, average particle size of 5 μm.

FB-20D: Trade name, Denka, silica filler, powder, average particle size of 20 μm.

FB-950: Trade name, Denka, silica filler.

Examples 1 to 25, Comparative Examples 1 and 2

Each solid content of SI-45, SI-auxiliary agent, and SI-60 (excluded in a case where a composition does not use SI-60) was weighed into a light-shielding container to have the same mixing ratio (for example, two times each) as indicated in Tables 1 to 3, and the same amount of γ-butyrolactone as the total weight of the measured solid content was added to dissolve the solid content, and thereby a polymerization initiator solution containing a storage stabilizer was prepared.

In another light-shielding container, 10 g of SI-B2A was weighed, and 10 g of γ-butyrolactone was added to dissolve the solid content, and thereby a 50% by mass solution of SI-B2A was prepared. Since UVI-6974 was originally a 50% by mass solution of propylene carbonate, it was used as it was. The same mixing ratio (for example, 2 times each) of the solid content of each polymerization initiator indicated in Table 1 was put into a light-shielding container to prepare a liquid mixture of a polymerization initiator (in a case where the liquid mixture may not be used, this step is unnecessary).

A predetermined amount of each main agent component indicated in Tables 1 to 3 was mixed to prepare a main agent mixture.

A liquid mixture of polymerization initiators (or a polymerization initiator solution containing a storage stabilizer) was weighed and added to this main agent mixture so that the polymerization initiators and storage stabilizers indicated in Tables 1 to 3 were in a predetermined amount. After adding the polymerization initiator, the mixture was quickly stirred and mixed for about 1 minute to obtain a curable composition.

Regarding the obtained curable composition, the pot life and curing completion time were measured in the following procedure. The results are indicated in Tables 1 to 3.

In Tables 1 to 3, "main agent" represents a cationic polymerizable compound, and the amounts (parts) of the main agent, the filler, the thermal polymerization initiator, the storage stabilizer, and the like are solid amounts.

Pot Life

The pot life of the curable composition was determined from the time when the prepared curable composition was allowed to stand in a room temperature environment, the temperature of the composition during that time was measured, and a resin temperature began to rise due to chain curing.

Curing Completion Time

The curing completion time of the curable composition was determined as the time when the prepared curable composition was allowed to stand in a room temperature environment, the temperature of the composition during that time was measured, and a resin temperature exceeded 45° C. and showed a peak of temperature rise.

Examples 26 to 31

Each solid content of SI-45 and SI-auxiliary agent was weighed into a light-shielding container to have the same mixing ratio (for example, two times each) as indicated in Tables 1 to 3, and the same amount of γ-butyrolactone as the total weight of the measured solid content was added to dissolve the solid content, and thereby a polymerization initiator solution containing a storage stabilizer was prepared.

A predetermined amount of each main agent component indicated in Table 3 was mixed to prepare a main agent mixture, and a predetermined amount of filler indicated in Table 3 was added thereto, and mixed and kneaded. When a uniform paste mixture was obtained, it was cooled to 15° C. or lower.

A polymerization initiator solution containing a storage stabilizer was weighed and added to the paste mixture at 15° C. or lower so as to be a predetermined amount of each polymerization initiator and storage stabilizer indicated in Table 3. After the addition, the mixture was uniformly kneaded to obtain a paste-form curable composition.

Regarding the obtained curable composition, the pot life and curing completion time were measured similarly to Example 1. The results are indicated in Table 3.

FIG. 1 is a graph in which an elapsed time from the start of heating of the curable compositions of Examples 3 to 25 is plotted on a horizontal axis, and the temperature of the curable composition is plotted on a vertical axis.

Figure 2:
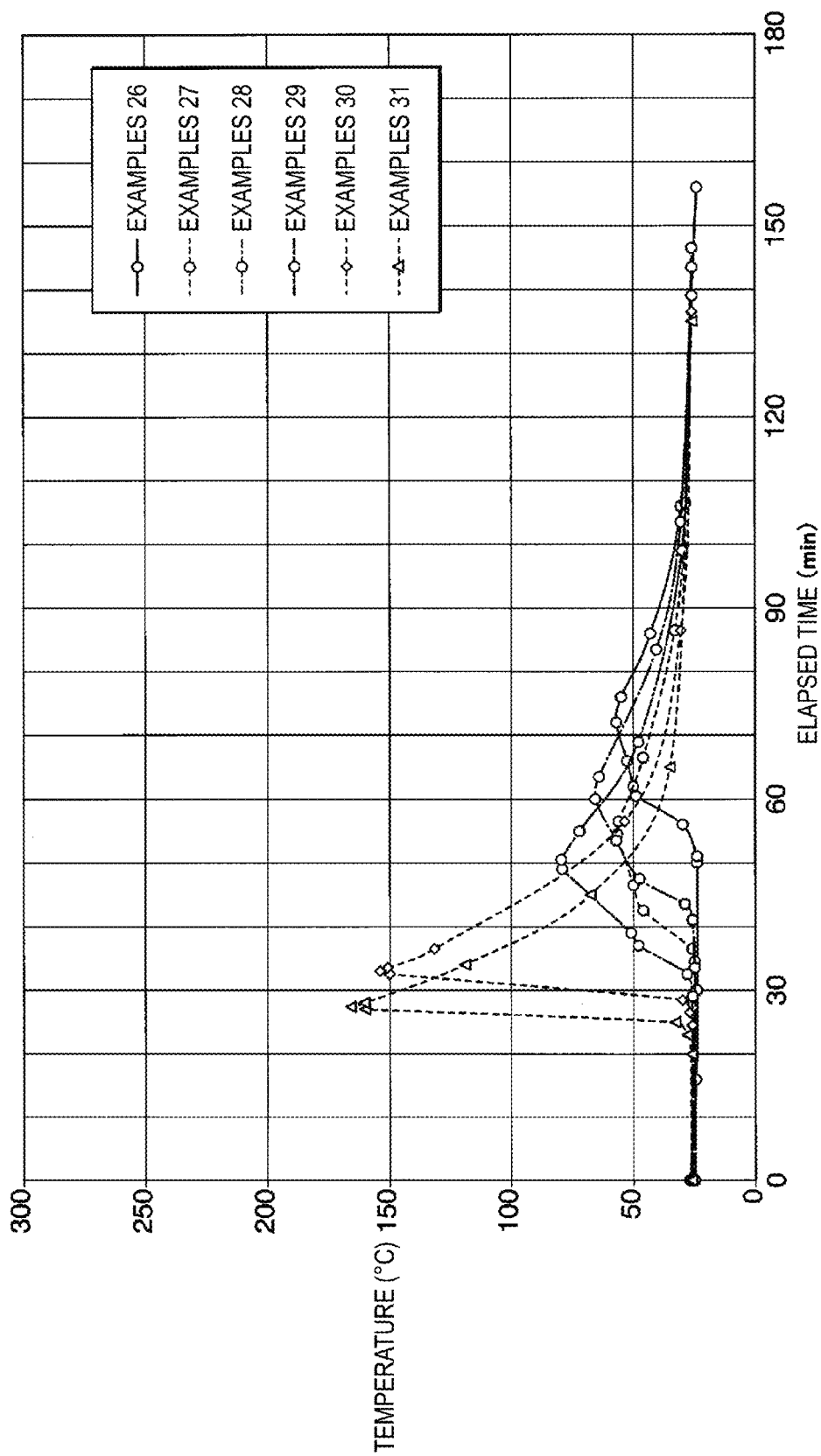
FIG. 2 is a graph illustrating a relationship between a temperature and an elapsed time from the start of heating of curable compositions of Examples 26 to 31.

FIG. 2 is a graph in which an elapsed time from the start of heating of the curable compositions of Examples 26 to 31 is plotted on a horizontal axis, and the temperature of the curable composition is plotted on a vertical axis.

TABLE 1

| | | | | Examples | | | | | |
|---|---|---|---|---|---|---|---|---|---|
| | | | | 1 | 2 | 3 | 4 | 5 | 6 |
| Curable composition | Main agent | 828 | Part | 50 | — | 40 | 40 | 40 | 50 |
| | | 2021P | Part | 50 | 50 | 40 | 40 | 40 | 25 |
| | | OXBP | Part | — | 50 | 20 | 20 | — | — |
| | | EHO | Part | — | — | — | — | 20 | 25 |
| | Filler | Silica: EXV-5 | Part | — | — | — | — | — | — |
| | | Silica: FB-5D | Part | — | — | — | — | — | — |
| | | Silica: FB-20D | Part | — | — | — | — | — | — |
| | | Silica: FB-950 | Part | — | — | — | — | — | — |
| | Thermal polymerization initiator | SI-60 | Part | 0.33244 | 0.6649 | — | — | — | — |
| | | SI-45 | Part | 0.33244 | 0.6649 | 0.735 | 1.47 | 0.735 | 0.735 |
| | | SI-B2A | Part | 0.075 | — | 0.15 | — | 0.15 | 0.15 |
| | Storage stabilizer: SI-auxiliary agent | | Part | 0.01013 | 0.0203 | 0.015 | 0.03 | 0.015 | 0.015 |
| | Solvent: γ-butyrolactone | | Part | 0.75 | 1.35 | 0.9 | 1.5 | 0.9 | 0.9 |
| | Photopolymerization initiator: UVI-6974 | | Part | 0.15 | 0.3 | — | — | — | — |
| Ratio of thermal polymerization initiator to 100 parts of main agent | | | Part | 0.73988 | 1.3298 | 0.885 | 1.47 | 0.885 | 0.885 |
| Ratio of storage stabilizer to 100 parts of thermal polymerization initiator | | | Part | 1.36847 | 1.52655 | 1.6949 | 2.0408 | 1.6949 | 1.6949 |

TABLE 1-continued

|  |  | 190 | 30 | 33 | 48 | 27.5 | 25 |
|---|---|---|---|---|---|---|---|
| Pot life | min | 190 | 30 | 33 | 48 | 27.5 | 25 |
| Curing completion time | hr | 3.35 | 0.6 | 0.6 | 0.84 | 0.47 | 0.44 |

|  |  |  |  | Examples |  |  |  |  |
|---|---|---|---|---|---|---|---|---|
|  |  |  |  | 7 | 8 | 9 | 10 | 11 |
| Curable composition | Main agent | 828 | Part | 40 | 60 | 40 | 60 | 60 |
|  |  | 2021P | Part | 40 | 20 | 40 | 20 | 20 |
|  |  | OXBP | Part | 20 | — | — | — | — |
|  |  | EHO | Part | — | 20 | 20 | 20 | 20 |
|  | Filler | Silica: EXV-5 | Part | — | — | — | — | — |
|  |  | Silica: FB-5D | Part | — | — | — | — | — |
|  |  | Silica: FB-20D | Part | — | — | — | — | — |
|  |  | Silica: FB-950 | Part | — | — | — | — | — |
|  | Thermal polymerization initiator | SI-60 | Part | — | — | — | — | — |
|  |  | SI-45 | Part | 1.455 | 0.735 | 1.455 | 1.455 | 0.97 |
|  |  | SI-B2A | Part | — | 0.15 | — | — | — |
|  | Storage stabilizer: SI-auxiliary agent |  | Part | 0.045 | 0.015 | 0.045 | 0.045 | 0.03 |
|  | Solvent: γ-butyrolactone |  | Part | 1.5 | 0.9 | 1.5 | 1.5 | 1 |
|  | Photopolymerization initiator: UVI-6974 |  | Part | — | — | — | — | — |
| Ratio of thermal polymerization initiator to 100 parts of main agent |  |  | Part | 1.455 | 0.885 | 1.455 | 1.455 | 0.97 |
| Ratio of storage stabilizer to 100 parts of thermal polymerization initiator |  |  | Part | 3.09278 | 1.6949 | 3.0928 | 3.0928 | 3.0928 |
| Pot life |  |  | min | 74.5 | 28 | 61 | 61.5 | 61.5 |
| Curing completion time |  |  | hr | 1.29 | 0.48 | 1.04 | 1.04 | 1.04 |

TABLE 2

|  |  |  |  | Examples |  |  |  |  |  |
|---|---|---|---|---|---|---|---|---|---|
|  |  |  |  | 12 | 13 | 14 | 15 | 16 | 17 |
| Curable composition | Main agent | 828 | Part | 40 | 60 | 60 | 65 | 80 | 80 |
|  |  | 2021P | Part | 40 | 20 | 20 | — | — | — |
|  |  | OXBP | Part | — | — | — | — | — | — |
|  |  | EHO | Part | 20 | 20 | 20 | 35 | 20 | 20 |
|  | Filler | Silica: EXV-5 | Part | — | — | — | — | — | — |
|  |  | Silica: FB-5D | Part | — | — | — | — | — | — |
|  |  | Silica: FB-20D | Part | — | — | — | — | — | — |
|  |  | Silica: FB-950 | Part | — | — | — | — | — | — |
|  | Thermal polymerization initiator | SI-60 | Part | — | — | — | — | — | — |
|  |  | SI-45 | Part | 0.7275 | 0.6173 | 0.97 | 1.455 | 1.455 | 0.97 |
|  |  | SI-B2A | Part | 0.15 | 0.0636 | — | — | — | — |
|  | Storage stabilizer: SI-auxiliary agent |  | Part | 0.0225 | 0.0191 | 0.03 | 0.045 | 0.045 | 0.03 |
|  | Solvent: γ-butyrolactone |  | Part | 0.9 | 0.7 | 1 | 1.5 | 1.5 | 1 |
|  | Photopolymerization initiator: UVI-6974 |  | Part | — | — | — | — | — | — |
| Ratio of thermal polymerization initiator to 100 parts of main agent |  |  | Part | 0.8775 | 0.6809 | 0.97 | 1.455 | 1.455 | 0.97 |
| Ratio of storage stabilizer to 100 parts of thermal polymerization initiator |  |  | Part | 2.5641 | 2.80511 | 3.0928 | 3.0928 | 3.0928 | 3.0928 |
| Pot life |  |  | min | 52 | 55.5 | 62 | 41 | 63 | 66 |
| Curing completion time |  |  | hr | 0.88 | 0.94 | 1.08 | 0.76 | 1.13 | 1.22 |

|  |  |  |  | Examples |  |  |  |  |
|---|---|---|---|---|---|---|---|---|
|  |  |  |  | 18 | 19 | 20 | 21 | 22 |
| Curable composition | Main agent | 828 | Part | 80 | 60 | 60 | 60 | 60 |
|  |  | 2021P | Part | — | 20 | 25 | 30 | 30 |
|  |  | OXBP | Part | — | 10 | 10 | 10 | 10 |
|  |  | EHO | Part | 20 | 10 | 5 | — | — |

TABLE 2-continued

|  |  |  |  |  |  |  |  |  |
|---|---|---|---|---|---|---|---|---|
|  | Filler | Silica: EXV-5 | Part | — | — | — | — | — |
|  |  | Silica: FB-5D | Part | — | — | — | — | — |
|  |  | Silica: FB-20D | Part | — | — | — | — | — |
|  |  | Silica: FB-950 | Part | — | — | — | — | — |
|  | Thermal polymerization initiator | SI-60 | Part | — | — | — | — | — |
|  |  | SI-45 | Part | 0.6173 | 0.97 | 0.97 | 0.97 | 1.47 |
|  |  | SI-B2A | Part | 0.0636 | — | — | — | — |
|  | Storage stabilizer: SI-auxiliary agent |  | Part | 0.0191 | 0.03 | 0.03 | 0.03 | 0.03 |
|  | Solvent: γ-butyrolactone |  | Part | 0.7 | 1 | 1 | 1 | 1.5 |
|  | Photopolymerization initiator: UVI-6974 |  | Part | — | — | — | — | — |
| Ratio of thermal polymerization initiator to 100 parts of main agent |  |  | Part | 0.6809 | 0.97 | 0.97 | 0.97 | 1.47 |
| Ratio of storage stabilizer to 100 parts of thermal polymerization initiator |  |  | Part | 2.80511 | 3.0928 | 3.0928 | 3.0928 | 2.0408 |
| Pot life |  |  | min | 71 | 59 | 76 | 120 | 77 |
| Curing completion time |  |  | hr | 1.31 | 1.00 | 1.31 | 2.16 | 1.42 |

TABLE 3

|  |  |  |  | Examples |  |  |  |  |  |
|---|---|---|---|---|---|---|---|---|---|
|  |  |  |  | 23 | 24 | 25 | 26 | 27 | 28 |
| Curable composition | Main agent | 828 | Part | 65 | 60 | 60 | 40 | 40 | 40 |
|  |  | 202 IP | Part | 20 | 20 | 20 | 40 | 40 | 40 |
|  |  | OXBP | Part | 10 | 10 | 10 | 20 | 20 | 20 |
|  |  | EHO | Part | 5 | 10 | 10 | — | — | — |
|  | Filler | Silica: EXV-5 | Part | — | — | — | 150 | — | — |
|  |  | Silica: FB-5D | Part | — | — | — | — | 150 | — |
|  |  | Silica: FB-20D | Part | — | — | — | — | — | 150 |
|  |  | Silica: FB-950 | Part | — | — | — | — | — | — |
|  | Thermal polymerization initiator | SI-60 | Part | — | — | — | — | — | — |
|  |  | SI-45 | Part | 0.97 | 0.98 | 0.975 | 0.98 | 0.98 | 0.98 |
|  |  | SI-B2A | Part | — | — | — | — | — | — |
|  | Storage stabilizer: SI-auxiliary |  | Part | 0.03 | 0.02 | 0.025 | 0.02 | 0.02 | 0.02 |
|  | Solvent: γ-butyrolactone |  | Part | 1 | 1 | 1 | 1 | 1 | 1 |
|  | Photopolymerization initiator: UVI-6974 |  | Part | — | — | — | — | — | — |
| Ratio of thermal polymerization initiator to 100 parts of main agent |  |  | Part | 0.97 | 0.98 | 0.975 | 0.98 | 0.98 | 0.98 |
| Ratio of storage stabilizer to 100 parts of thermal polymerization initiator |  |  | Part | 3.09278 | 2.04082 | 2.5641 | 2.0408 | 2.0408 | 2.0408 |
| Pot life |  |  | min | 87 | 42 | 52 | 56 | 36.5 | 43.5 |
| Curing completion time |  |  | hr | 1.51 | 0.74 | 0.90 | 1.2 | 0.91 | 1 |

|  |  |  |  | Examples |  |  | Comparative Examples |  |
|---|---|---|---|---|---|---|---|---|
|  |  |  |  | 29 | 30 | 31 | 1 | 2 |
| Curable composition | Main agent | 828 | Part | 40 | 40 | 40 | — | 100 |
|  |  | 202 IP | Part | 40 | 35 | 30 | 100 | — |
|  |  | OXBP | Part | 20 | 20 | 20 | — | — |
|  |  | EHO | Part | — | 5 | 10 | — | — |
|  | Filler | Silica: EXV-5 | Part | — | — | — | — | — |
|  |  | Silica: FB-5D | Part | — | 150 | 150 | — | — |
|  |  | Silica: FB-20D | Part | — | — | — | — | — |
|  |  | Silica: FB-950 | Part | 150 | — | — | — | — |

TABLE 3-continued

|  |  |  |  |  |  |  |  |
|---|---|---|---|---|---|---|---|
|  | Thermal polymerization initiator | SI-60 | Part | — | — | — | — | — |
|  |  | SI-45 | Part | 0.98 | 0.98 | 0.98 | 1.5 | 1.5 |
|  |  | SI-B2A | Part | — | — | — | — | — |
|  | Storage stabilizer: SI-auxiliary |  | Part | 0.02 | 0.02 | 0.02 | — | — |
|  | Solvent: γ-butyrolactone |  | Part | 1 | 1 | 1 | 1.5 | 1.5 |
|  | Photopolymerization initiator: UVI-6974 |  | Part | — | — | — | — | — |
| Ratio of thermal polymerization initiator to 100 parts of main agent |  |  | Part | 0.98 | 0.98 | 0.98 | 1.5 | 1.5 |
| Ratio of storage stabilizer to 100 parts of thermal polymerization initiator |  |  | Part | 2.04082 | 2.0408 | 2.0408 | 0 | 0 |
| Pot life |  |  | min | 32.5 | 28.5 | 25 | 10 | 110 |
| Curing completion time |  |  | hr | 0.84 | 0.55 | 0.46 | 0.17 | — |

The curable compositions of Examples 1 to 31 had a pot life of 20 minutes or longer, and the curing was completed within 2.2 hours.

The curable composition of Comparative Example 1 containing only an alicyclic epoxy compound as a cationic polymerizable compound and no storage stabilizer had a pot life of 20 minutes or shorter.

The curable composition of Comparative Example 2 containing only a glycidyl ether compound as the cationic polymerizable compound and no storage stabilizer did not complete curing within 8 hours.

From the comparison between FIG. 1 and FIG. 2, it was confirmed that the heat generation of the curable composition can be suppressed by including the filler.

Examples 32 to 50, Comparative Examples 3 to 7

Each solid content of SI-45 and SI-auxiliary agent was weighed into a light-shielding container to have the same mixing ratio (for example, two times each) as indicated in Table 4, and the same amount of γ-butyrolactone as the total weight of the measured solid content was added to dissolve the solid content, and thereby a polymerization initiator solution containing a storage stabilizer was prepared.

In another light-shielding container, 10 g of SI-B2A was weighed, and 10 g of γ-butyrolactone was added to dissolve the solid content, and thereby a 50% by mass solution of SI-B2A was prepared. Since UVI-6974 was originally a 50% by mass solution of propylene carbonate, it was used as it was. The same mixing ratio (for example, 2 times each) of the solid content of each polymerization initiator indicated in Table 4 was put into a light-shielding container to prepare a liquid mixture of a polymerization initiator (in a case where the liquid mixture may not be used, this step is unnecessary).

A predetermined amount of each main agent component indicated in Table 4 was mixed to prepare a main agent mixture, and a predetermined amount of filler indicated in Table 4 was added thereto, and mixed and kneaded. When a uniform paste mixture was obtained, it was cooled to 15° C. or lower.

A liquid mixture of a polymerization initiator (or a polymerization initiator solution containing a storage stabilizer) was weighed and added to the paste mixture at 15° C. or lower so as to be a predetermined amount of each polymerization initiator and storage stabilizer indicated in Table 4. After the addition, the mixture was uniformly kneaded to obtain a paste-form curable composition.

Figure 3:
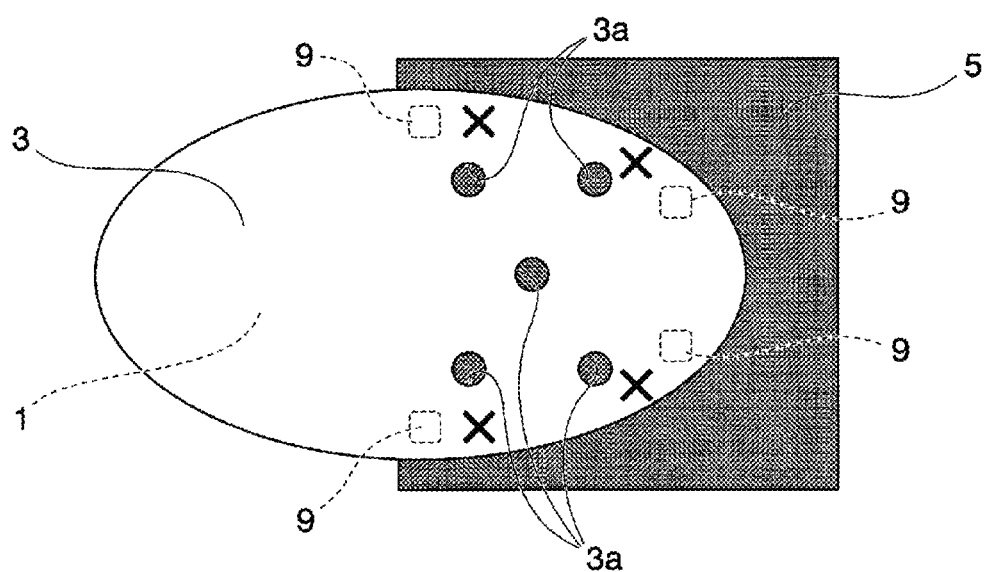
FIG. 3 is a schematic top view illustrating an evaluation sample in an application simulation test in examples.
Figure 4:
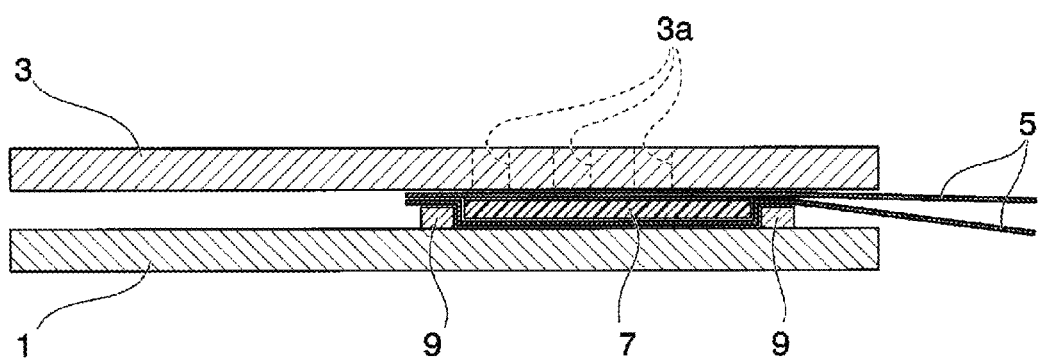
FIG. 4 is a schematic side view of the evaluation sample.
Figure 5:
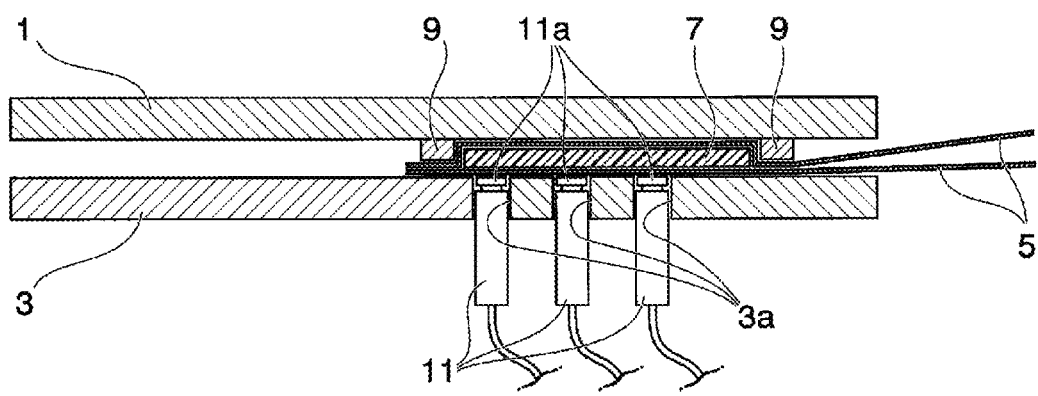
FIG. 5 is a schematic view illustrating an implementation status of the application simulation test.

An application simulation test used for evaluating the curable composition will be described with reference to FIGS. 3 to 5. FIG. 3 is a schematic top view illustrating an evaluation sample in the application simulation test, and FIG. 4 is a side view thereof. FIG. 5 is a schematic view illustrating an implementation status of the application simulation test. The outline of the test is as follows.

Two plates having different types of materials, a CFRP plate 1 and a Ti plate 3, and a heater 11 having a rod-shaped tip portion 11a that can be heated to 60° C. were prepared. The CFRP plate 1 and the Ti plate 3 are elliptical shapes having a major axis of 700 mm and a minor axis of 300 mm, respectively. Five through holes 3a (diameter of 15 mm) for inserting the rod-shaped tip portion 11a of the heater 11 are formed in a range from the center to one end of the Ti plate 3 in the major axis direction. The five through holes 3a are formed at the positions of the four apexes of a quadrangle and the center from the top view.

The paste-form curable composition obtained above was applied and sandwiched between the two plates, with a resin film 5 disposed on a contact surface with each plate, and clamped and fixed while the gap was maintained by a spacer 9 (thickness of 3.0 mm). Thus, an evaluation sample in which the CFRP plate 1, the resin film 5, the curable composition layer 7 (thickness of 3.0 mm), the resin film 5, and the Ti plate 3 were laminated in this order was obtained. The spacers 9 were arranged at four locations so as to surround the five through holes 3a within a range from one end to the center of the Ti plate 3 in the major axis direction. Each of the spacers 9 was inserted between the CFRP plate 1 and the resin film 5 on the CFRP plate 1 side. The clamping position was set in the vicinity of each of the four spacers 9 (the position marked with a cross in FIG. 3).

After clamping and fixing, the rod-shaped tip portion 11a of the heater 11 was heated and held at 60° C., inserted into the through hole 3a of the Ti plate 3 of the evaluation sample, and fixed for 1 hour, and then the heater 11 was removed. However, some tests were conducted with the heater 11 removed from the beginning. Of the curable composition layer 7 of the evaluation sample, the contact portion with the inserted rod-shaped tip portion 11a was set as a forced curing portion, a portion away from the heater 11 without the influence of the heater 11 (for example, the end of the curable composition layer 7 on the end side of the right side (long axis right end side) of the ellipse in FIG. 3) was set as a natural curing portion so as to perform the following evaluation. The results are indicated in Table 5.

Natural Curing

The paste-form curable composition was sandwiched between the plates 1 and 3 as illustrated in FIGS. 3 and 4 to form the curable composition layer 7 having a thickness of 3 mm. These samples were cured under the above-described conditions as illustrated in FIG. 5, and the portion away from the heater 11 without the influence of the heater 11 was set as a natural curing portion. Until the curing was completed, the temperature and hardness (Shore hardness) of the curable composition were measured. The hardness (Shore hardness) was measured with a hardness meter, and the hardness 6 hours after the start of curing was determined according to the following criteria.

A (Particularly good): Hardness of 60 Hs or higher within 3 hours.
B (Good): Hardness is 60 Hs or higher.
C (Defect): Hardness is 30 Hs or higher and lower than 60 Hs.
D (Not acceptable): Hardness is lower than 30 Hs.

Forced Curing

The paste-form curable composition 7 was sandwiched between the plates 1 and 3 as illustrated in FIGS. 3 and 4 to form the curable composition layer having a thickness of 3 mm. These samples were cured under the above-described conditions as illustrated in FIG. 5, and a portion where the rod-shaped tip portion (held at 60° C.) of the heater 11 was in contact was defined as a forced curing portion. The heater was removed after 1 hour, the hardness (Shore hardness) of the forced curing portion was measured with a hardness meter, and the hardness 1 hour after the start of curing was determined according to the following criteria.

A (Particularly good): Hardness of 60 Hs or higher.
B (Good): Hardness is 30 Hs or higher and lower than 60 Hs.
C (Defect): Hardness is 15 Hs or higher and lower than 30 Hs.
D (Not acceptable): Hardness is lower than 15 Hs.

Reaching Temperature (Natural/Forced)

Determination was made according to the following criteria from a peak value of the measured resin temperature.

A (Particularly good): 60° C. or lower.
B (Good): Higher than 60° C. and 93° C. or lower (within 30 minutes).
C (Defect): Higher than 60° C. and 93° C. or lower (30 minutes or longer).
D (Not acceptable): Higher than 93° C.

Pot Life

The temperature of the composition was measured, and the shorter time of the time when the resin temperature was higher than 45° C. or the time indicating the peak temperature was set as the pot life of the cured product to perform the evaluation according to the following criteria.

A (Particularly good): 45 minutes or longer.
B (Good): 20 minutes or longer and shorter than 45 minutes.
C (Defect): 15 minutes or longer and shorter than 20 minutes.
D (Not acceptable): Shorter than 15 minutes.

TABLE 4

| | Mixing [g] | | | | | | | | | | | |
|---|---|---|---|---|---|---|---|---|---|---|---|---|
| | Main agent | | | | Thermal polymerization initiator | | Storage stabilizer 50 wt % solution | UVI-6974 50 wt % solution | Filler | | | |
| | | | | | SI-45 50 wt % solution | SI-B2A 50 wt % solution | | | | | | |
| | 828 | 2021P | OXBP | EHO | | | | | EXV-5 | URE-FIL9 | FB-5D | FB-20D |
| Comparative Example 3 | — | 100 | — | — | — | 0.6 | — | — | — | 5.8 | — | — |
| Comparative Example 4 | 100 | — | — | — | — | 0.6 | — | — | — | 1.6 | — | — |
| Comparative Example 5 | — | 100 | — | — | 2.342 | — | 0.058 | 0.6 | — | 6 | — | — |
| Comparative Example 6 | 25 | 25 | — | — | — | 0.3 | — | — | — | 3 | — | — |
| Comparative Example 7 | 15 | 35 | — | — | — | 0.3 | — | — | — | 3.7 | — | — |
| Example 32 | 20 | 20 | 10 | — | 1.485 | 0.3 | 0.015 | — | — | 3 | — | — |
| Example 33 | 20 | 20 | 10 | — | 1.485 | — | 0.015 | — | — | 3 | — | — |
| Example 34 | 20 | 20 | — | 10 | 1.455 | — | 0.045 | — | — | 3 | — | — |
| Example 35 | 20 | 20 | — | 10 | 0.728 | 0.15 | 0.0225 | — | — | 3 | — | — |
| Example 36 | 30 | 10 | — | 10 | 1.455 | — | 0.045 | — | — | 2.5 | — | — |
| Example 37 | 30 | 10 | — | 10 | 0.97 | — | 0.03 | — | — | 2.5 | — | — |
| Example 38 | 32.5 | — | — | 17.5 | 1.455 | — | 0.045 | — | — | 2.5 | — | — |
| Example 39 | 30 | 10 | 5 | 5 | 0.97 | — | 0.03 | — | — | 2.5 | — | — |
| Example 40 | 30 | 10 | 5 | 5 | 0.98 | — | 0.02 | — | — | 2.5 | — | — |
| Example 41 | 30 | 12.5 | 5 | 2.5 | 0.98 | — | 0.02 | — | — | 2.5 | — | — |
| Example 42 | 30 | 11 | 5 | 4 | 0.98 | — | 0.02 | — | — | 2.5 | — | — |
| Example 43 | 11.2 | 11.2 | 5.6 | — | 0.549 | — | 0.0112 | — | 35 | 1.4 | — | — |
| Example 44 | 11.2 | 9.8 | 5.6 | 1.4 | 0.549 | — | 0.0112 | — | 35 | 2.1 | — | — |
| Example 45 | 11.2 | 11.2 | 5.6 | — | 0.549 | — | 0.0112 | — | — | 1.4 | 35 | — |
| Example 46 | 11.2 | 11.2 | 5.6 | — | 0.549 | — | 0.0112 | — | — | 1.4 | — | 35 |
| Example 47 | 11.2 | 9.8 | 5.6 | 1.4 | 0.549 | — | 0.0112 | — | — | 2.1 | — | 35 |
| Example 48 | 11.2 | 8.4 | 5.6 | 2.8 | 0.549 | — | 0.0112 | — | — | 2.1 | — | 35 |
| Example 49 | 11.2 | 8.4 | 5.6 | 2.8 | 0.546 | — | 0.014 | — | — | 2.1 | — | 35 |
| Example 50 | 11.2 | 8.4 | 5.6 | 2.8 | 0.543 | — | 0.0168 | — | — | 2.1 | — | 35 |

TABLE 5

|  | Ratio of thermal polymerization initiator to 100 parts of main agent (parts) (Solid content conversion) | Ratio of storage stabilizer to 100 parts of thermal polymerization initiator (parts) (Solid content conversion) | Evaluation items | | | |
|---|---|---|---|---|---|---|
|  |  |  | Reaching temperature (Reaching temperature of past material) | Hardness | | Pot life |
|  |  |  |  | Natural curing | Forced curing |  |
| Comparative Example 3 | 0.3 | 0 | (D)*1 | (A)*1 | (A)*1 | x |
| Comparative Example 4 | 0.3 | 0 | A | x | x | A |
| Comparative Example 5 | 1.171 | 2.477 | A | x | x | A |
| Comparative Example 6 | 0.3 | 0 | A | x | C | A |
| Comparative Example 7 | 0.3 | 0 | A | x | B | A |
| Example 32 | 1.785 | 0.840 | A | A | (A)*1 | B |
| Example 33 | 1.485 | 1.010 | A | A | (A)*2 | B |
| Example 34 | 1.455 | 3.093 | A | A | (A)*3 | A |
| Example 35 | 0.878 | 2.563 | A | A | (A)*3 | A |
| Example 36 | 1.455 | 3.093 | A | B | (B to A) *4 | A |
| Example 37 | 0.97 | 3.093 | A | B | A | A |
| Example 38 | 1.455 | 3.093 | A | B | (B to A) *4 | A |
| Example 39 | 0.97 | 3.093 | B | A | B | A |
| Example 40 | 0.98 | 2.041 | B | A | B | B |
| Example 41 | 0.98 | 2.041 | A | B | B | B |
| Example 42 | 0.98 | 2.041 | B | B | A | A |
| Example 43 | 0.98 | 2.040 | A | B | B | A |
| Example 44 | 0.98 | 2.040 | A | B | B | A |
| Example 45 | 0.98 | 2.040 | A | B | B | A |
| Example 46 | 0.98 | 2.040 | A | B | B | A |
| Example 47 | 0.98 | 2.040 | A | B | B | A |
| Example 48 | 0.98 | 2.040 | A | A | B | B |
| Example 49 | 0.975 | 2.564 | A | B | (B to A) *4 | A |
| Example 50 | 0.97 | 3.094 | A | B | (B to A) *4 | A |

*1 Immediately after preparation of the paste material, the reaction started/high temperature was completely cured (coating on the jig was not completed).
*2 Forced curing test has not been conducted. However, from the result of natural curing (@RT, 1 hr ≥60 Hs), A is determined to be clear.
*3 Forced curing test has not been conducted. However, it is estimated as A from the results of the natural curing (@RT, 3 hr, ≥60 Hs).
*4 Forced curing test has not been conducted. However, it is estimated from B to A from the results of the natural curing (@RT, 6 hr, ≥60 Hs).

"Main agent" in Tables 4 to 5 represents a cationic polymerizable compound. In Table 5, the ratio of the thermal polymerization initiator to 100 parts by mass of the main agent and the ratio of the storage stabilizer to 100 parts by mass of the thermal polymerization initiator are values in solid content.

The curable compositions of the examples had a sufficiently long pot life, and was able to be rapidly cured even at a temperature of 60° C. or lower after the pot life had elapsed and by natural curing (room temperature).

The invention claimed is:
1. A curable composition comprising:
a cationic polymerizable compound;
a thermal polymerization initiator; and
a storage stabilizer, and
a filler, wherein the cationic polymerizable compound includes
at least one glycidyl ether compound, at least one alicyclic epoxy compound, and at least one oxetane compound; or
at least one glycidyl ether compound, and at least one oxetane compound; or
at least one alicyclic epoxy compound, and at least one oxetane compound,
the oxetane compound includes 4,4'-bis[(3-ethyl-3-oxetanyl) methoxymethyl] biphenyl,
the thermal polymerization initiator is a compound capable of decomposing at a temperature of 65° C. or lower and generating a Lewis acid or a protonic acid,
the thermal polymerization initiator includes a sulfonium salt represented by the following Formula (I-1-1),

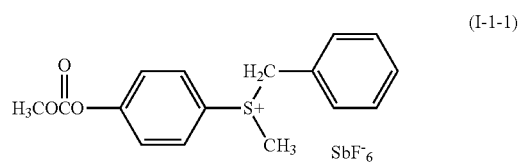

(I-1-1)

and a sulfonium salt represented by the following Formula (I-2),

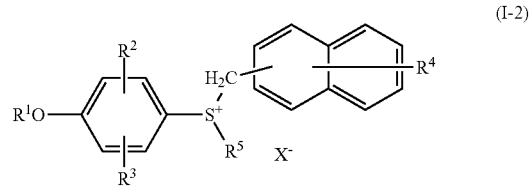

(I-2)

wherein R¹ represent a hydrogen atom, a methyl group, an acetyl group, or a methoxycarbonyl group, R², and R³ each independently represents a hydrogen atom, a halogen atom, or an alkyl group having 1 to 4 carbon atoms, and R⁴ represents a hydrogen atom, a halogen atom, a nitro group, a methyl group, or a methoxy group, R⁵ represents an alkyl group having 1 to 4 carbon atoms, and X represents $SbF_6$, $PF_6$, $AsF_6$, or $BF_4$, a content of the thermal polymerization initiator is 0.3 to 3 parts by mass with respect to 100 parts by mass of the cationic polymerizable compound, the storage stabilizer is a compound that can capture the Lewis acid or the protonic acid generated by the decomposition of the thermal polymerization initiator, the filler is at least one selected from the group consisting of glass, silica, ceramic, plastic, and metal, a content of the filler is 50-80% by mass with respect to the total mass of the curable composition, and chain curing is enabled by thermal energy generated by a polymerization reaction of the cationic polymerizable compound at a temperature of 65° C. or lower.

2. The curable composition according to claim 1, wherein a pot life at room temperature is 20 minutes or longer.

3. The curable composition according to claim 1, wherein the glycidyl ether compound is at least one selected from the group consisting of a bisphenol A type diglycidyl ether compound and a bisphenol F type diglycidyl ether compound, the alicyclic epoxy compound is 3,4-epoxycyclohexylmethyl-3,4-epoxycyclohexanecarboxylate, and the oxetane compound is 4,4'-bis[(3-ethyl-3-oxetanyl) methoxymethyl] biphenyl or a mixture of 4,4'-bis[(3-ethyl-3-oxetanyl) methoxymethyl] biphenyl and 3-ethyl-3-hydroxymethyloxetane.

4. The curable composition according to claim 1, wherein the storage stabilizer is at least one selected from the group consisting of sulfonium salts represented by the following Formula (II),

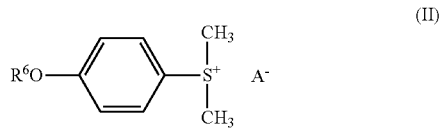

wherein R⁶ represents an acetyl group or a methoxycarbonyl group, and A represents $CH_3SO_4$.

5. The curable composition according to claim 1, wherein a content of the storage stabilizer is from 0.3 to 5 parts by mass with respect to 100 parts by mass of the thermal polymerization initiator.

6. A curable paste material comprising the curable composition described in claim 1.

7. A curable sheet material comprising the curable composition described in claim 1.

8. A curable modeling material comprising the curable composition described in claim 1.

9. A method of curing the curable composition described in claim 1, wherein the method comprises curing the curable composition at a temperature of 65° C. or lower.

10. A cured product obtained by curing the curable composition described in claim 1, wherein the cured product is a cured paste, a cured sheet or a cured modeling material.

11. The cured product according to claim 10, wherein a hardness is 60 Hs or higher.

12. A method of curing the curable paste material described in claim 6, the method comprising curing the curable paste material at a temperature of 65° C. or lower.

13. A method of curing the curable sheet material described in claim 7, the method comprising curing the curable sheet material at a temperature of 65° C. or lower.

14. A method of curing the curable modeling material described in claim 8, the method comprising curing the curable modeling material at a temperature of 65° C. or lower.

15. A cured product obtained by curing the curable composition described in claim 1.

16. A curable composition comprising:
a cationic polymerizable compound;
a thermal polymerization initiator; and
a storage stabilizer, and
a filler, wherein the cationic polymerizable compound includes at least one glycidyl ether compound, at least one alicyclic epoxy compound, and at least one oxetane compound, the thermal polymerization initiator is a compound capable of decomposing at a temperature of 65° C. or lower and generating a Lewis acid or a protonic acid, the thermal polymerization initiator includes a sulfonium salt represented by the following Formula (I-1-1),

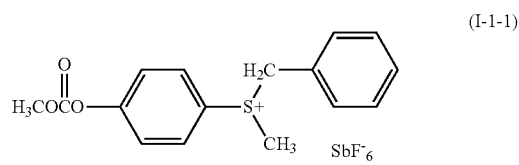

and a sulfonium salt represented by the following Formula (I-2),

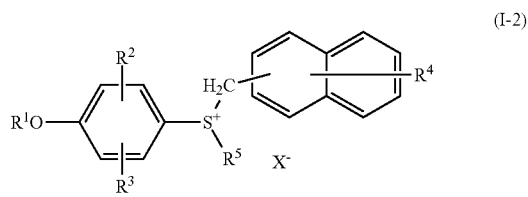

wherein R¹ represent a hydrogen atom, a methyl group, an acetyl group, or a methoxycarbonyl group, R², and R³ each independently represents a hydrogen atom, a halogen atom, or an alkyl group having 1 to 4 carbon atoms, and R⁴ represents a hydrogen atom, a halogen atom, a nitro group, a methyl group, or a methoxy group, R⁵ represents an alkyl group having 1 to 4 carbon atoms, and X represents $SbF_6$, $PF_6$, $AsF_6$, or $BF_4$, a content of the thermal polymerization initiator is 0.3 to 3 parts by mass with respect to 100 parts by mass of the cationic polymerizable compound, the storage stabilizer is at least one selected from the group consisting of sulfonium salts represented by the following Formula (II),

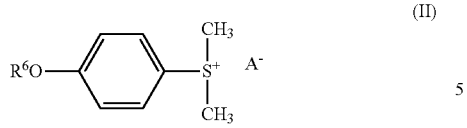

wherein $R^6$ represents an acetyl group or a methoxycarbonyl group, and A represents $CH_3SO_4$, the filler is at least one selected from the group consisting of glass, silica, ceramic, plastic, and metal, a content of the filler is 50-80% by mass with respect to the total mass of the curable composition, and chain curing is enabled by thermal energy generated by a polymerization reaction of the cationic polymerizable compound at a temperature of 65° C. or lower.

17. The curable composition according to claim 16, wherein a content of the glycidyl ether compound is from 10% to 80% by mass, with respect to the total mass of the cationic polymerizable compound.

18. The curable composition according to claim 16, wherein a content of the alicyclic epoxy compound is from 10% to 80% by mass, with respect to the total mass of the cationic polymerizable compound.

19. The curable composition according to claim 16, wherein a content of the oxetane compound is from 5% to 70% by mass, with respect to the total mass of the cationic polymerizable compound.

20. A curable composition comprising:
   a cationic polymerizable compound;
   a thermal polymerization initiator; and
   a storage stabilizer,
   wherein the cationic polymerizable compound includes at least one glycidyl ether compound, at least one alicyclic epoxy compound, and at least one oxetane compound; or
   at least one glycidyl ether compound, and at least one oxetane compound; or
   at least one alicyclic epoxy compound, and at least one oxetane compound,
   the oxetane compound includes 4,4'-bis[(3-ethyl-3-oxetanyl) methoxymethyl] biphenyl,
   the thermal polymerization initiator is a compound capable of decomposing at a temperature of 65° C. or lower and generating a Lewis acid or a protonic acid,
   the thermal polymerization initiator includes a sulfonium salt represented by the following Formula (I-1-1),

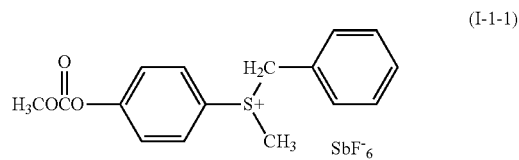

and a sulfonium salt represented by the following Formula (I-2),

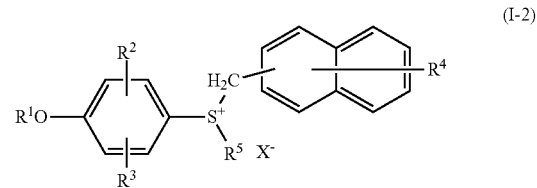

wherein $R^1$ represents a hydrogen atom, a methyl group, an acetyl group, or a methoxycarbonyl group, $R^2$ and $R^3$ each independently represents a hydrogen atom, a halogen atom, or an alkyl group having 1 to 4 carbon atoms, and $R^4$ represents a hydrogen atom, a halogen atom, a nitro group, a methyl group, or a methoxy group, $R^5$ represents an alkyl group having 1 to 4 carbon atoms, and X represents $SbF_6$, $PF_6$, $AsF_6$ or $BF_4$, a content of the thermal polymerization initiator is 0.3 to 3 parts by mass with respect to 100 parts by mass of the cationic polymerizable compound, the storage stabilizer is a compound that can capture the Lewis acid or the protonic acid generated by the decomposition of the thermal polymerization initiator, and chain curing is enabled by thermal energy generated by a polymerization reaction of the cationic polymerizable compound at a temperature of 65° C. or lower.

* * * * *